(12) United States Patent　　(10) Patent No.: US 11,765,264 B2
Mazzarella　　(45) Date of Patent: Sep. 19, 2023

(54) AMBIGUATED CONTROL FUNCTIONS FOR COVERT COMMUNICATIONS

(71) Applicant: Mutualink, Inc., Wallingford, CT (US)

(72) Inventor: Joseph R. Mazzarella, Tolland, CT (US)

(73) Assignee: MUTUALINK, INC., Wallingford, CT (US)

( * ) Notice: Subject to any disclaimer, the term of this patent is extended or adjusted under 35 U.S.C. 154(b) by 0 days.

(21) Appl. No.: 17/203,298

(22) Filed: Mar. 16, 2021

(65) Prior Publication Data
US 2022/0303384 A1　　Sep. 22, 2022

(51) Int. Cl.
| | |
|---|---|
| *G06F 3/0482* | (2013.01) |
| *G06F 3/0484* | (2022.01) |
| *H04M 1/72469* | (2021.01) |
| *A63F 13/533* | (2014.01) |
| *G06F 3/04883* | (2022.01) |

(52) U.S. Cl.
CPC ....... *H04M 1/72469* (2021.01); *A63F 13/533* (2014.09); *G06F 3/0482* (2013.01); *G06F 3/0484* (2013.01); *A63F 2300/308* (2013.01); *G06F 3/04883* (2013.01); *G06F 2203/04804* (2013.01)

(58) Field of Classification Search
CPC ...... G06F 3/04817; G06F 21/45; G06F 21/21; G06F 21/6245; G06F 21/31; G06F 21/84; G06F 3/04842; G06F 3/0482; G06F 3/0484; G06F 3/04883; G06F 2203/04804; H04M 1/72469; A63F 13/533; A63F 2300/308
See application file for complete search history.

(56) References Cited

U.S. PATENT DOCUMENTS

| | | | |
|---|---|---|---|
| 2010/0223579 A1 | 9/2010 | Schwartz | |
| 2014/0365903 A1* | 12/2014 | Seo | G06F 3/04883 |
| | | | 715/741 |
| 2017/0083711 A1* | 3/2017 | Hemaraj | G06F 3/167 |
| 2017/0111342 A1 | 4/2017 | Fitzgerald | |
| 2018/0364893 A1* | 12/2018 | Lin | G06F 3/04842 |
| 2022/0137800 A1* | 5/2022 | Long | A63F 13/22 |
| | | | 715/769 |

OTHER PUBLICATIONS

International Search Report and Written Opinion of the International Searching Authority directed to related International Patent Application No. PCT/US2022/020405, dated Jun. 9, 2022; 11 pages.

* cited by examiner

*Primary Examiner* — Nhat Huy T Nguyen
(74) *Attorney, Agent, or Firm* — Sterne, Kessler, Goldstein & Fox P.L.L.C.

(57) ABSTRACT

Some embodiments include an ambiguated application that can perform first functions, e.g., a communication application functions, when the ambiguated application is in a first state, and perform second functions, e.g., game functions, when the ambiguated application is in a second state. The ambiguated application in the first state and the ambiguated application in the second state share a same graphic user interface (GUI). When a functional object of the GUI is selected, the ambiguated application performs a first function if the ambiguated application is in a first state. In addition, when the same functional object of the GUI is selected, the ambiguated application performs a second function if the ambiguated application is in a second state.

21 Claims, 9 Drawing Sheets

AMBIGUATED CONTROL FUNCTIONS FOR COVERT COMMUNICATIONS

BACKGROUND

Field

The embodiments generally relate to ambiguated application and covert communication.

Background

There are many kinds of communication devices and systems based on various communication technologies with different functionalities and for different purposes. For example, smartphones or other consumer devices are used by the general public in cellular wireless communication networks, e.g., Long Term Evolution (LTE) networks. On the other hand, push-to-talk (PTT), also known as press-to-transmit, is a technology of having conversations on half-duplex communication lines, including two-way radio, using a momentary button to switch from voice reception mode to transmit mode. Users engaging in communications for special purposes, e.g., investigative purposes or law enforcement purposes, often use PTT technology due to the ease of network setup.

Often, special hardware devices different from general communication devices are used in PTT to communicate over a wireless network, e.g., the land mobile radio (LMR) network. With the advance of technology, it is possible to implement PTT on consumer devices, e.g., smartphones, by an application software, or simply a PTT application. Hence, a user of a general communication device, e.g., a smartphone, with a PTT application can communicate with an interconnected LMR user. The use of a smartphone with a PTT application has intrinsic advantages over a special LMR device for PTT, since a smartphone is normally smaller and not generally recognizable as a special purpose communications device. Besides the PTT application, a smart phone can further have other communication applications, e.g., social networking messaging and communications.

BRIEF SUMMARY OF THE INVENTION

A general communication device, e.g., a smartphone, can have different communication applications, e.g., push-to-talk (PTT) application, social networking messaging and communications, installed for different purposes. The public is generally aware that a communication device with different communication applications can be used in surreptitious ways. Hence, it becomes more difficult to achieve the desired security while using PTT or other communication applications operated on a communication device in a discrete or covert manner for special purposes, e.g., investigative purposes. There are increasing challenges and security risks for public safety personnel performing duties in discrete or covert communications using general communication devices, e.g., smartphones.

Some embodiments include a system, method, and computer program product for performing covert communications using an ambiguated application operated on a communication device. The ambiguated application can perform as a communication application, when the ambiguated application is in a first state, and perform as a game, when the ambiguated application is in a second state. A functional object in a graphical user interface (GUI) of the ambiguated application can have different meanings when the ambiguated application is in a different state, hence the GUI can be referred to as an ambiguated GUI. When the functional object of the GUI is selected, the ambiguated application performs a first function if the ambiguated application is in a first state. In addition, when the same functional object of the GUI is selected, the ambiguated application performs a second function if the ambiguated application is in a second state.

Some embodiments include a communication device that includes a transceiver, one or more processors coupled to the transceiver, and an ambiguated application operated by the one or more processors. The communication device can be a smart phone, a laptop, a tablet, a desktop computer, a server, a personal assistant, a monitor, a wearable device, an Internet of Thing (IoT) device, a mobile station, a subscriber station, a remote terminal, a wireless terminal, or a user device.

In some embodiments, the transceiver of the communication device is configured to communicate in a wireless communication network. The wireless communication network can include the communication device and another communication device forming an ad hoc wireless network, a communication talk group, or a mobile push-to-talk (PTT) group. In some embodiments, the wireless communication network is a first wireless communication network, and the communication device is further configured to wirelessly communicate through a second wireless communication network, e.g., a cellular wireless communication network.

In some embodiments, the ambiguated application can include a GUI having a functional object. The functional object can include a symbol, a shape, a color, an image, an area defined by a shape transparent or invisible to a human, an area visually bounded by a visible line with a transparent interior, or an area that has no visible line boundary with a transient or semitransparent interior. In addition, the functional object can be controlled by a touch or a gesture of a user. The functional object within the GUI of the ambiguated application can have a different meaning when the ambiguated application is in a different state, hence the GUI can be referred to as an ambiguated GUI.

In some embodiments, when the functional object of the GUI is selected, the one or more processors of the communication device can be configured to perform a first function if the ambiguated application is in a first state, e.g., a covert communication state. In some embodiments, the ambiguated application can perform as a communication application, while the first function can include a photo capture function, a video recording function, an audio recording function, a sending function, a receiving function, a muting audio function, a push to talk voice communication control function, or any other communication or control functions.

In some embodiments, when the functional object of the GUI is selected, the one or more processors of the communication device can be configured to perform a second function or represent an object if the ambiguated application is in a second state, e.g., a decoy state, a game state, or a gallery state. For example, if the ambiguated application is in the second state, the ambiguated application performs as a game to be played on the communication device, and the second function represents a function of the game. Additionally and alternatively, the ambiguated application can present one or more images when the ambiguated application is in the gallery state, and the functional object includes a portion of the one or more images. Furthermore, the ambiguated application can be in a third state, e.g., an administrative state, and the one or more processors can be configured to setup a portion of the GUI or the functional object when the ambiguated application is in the third state.

In some embodiments, the GUI can be a first GUI for the ambiguated application, and the ambiguated application can further include a second GUI with substantially same functions as represented by the first GUI. The second GUI can be active when the ambiguated application is in a fourth state, e.g., an explicit communication state.

In some embodiments, the GUI of the ambiguated application can further include a first visible indicator to indicate that the ambiguated application is in the first state, and a second visible indicator to indicate that the ambiguated application is in the second state. There can be more visible indicators to indicate the ambiguated application is in the third state or the fourth state. The first indicator and the second indicator can differ in color hue, tone, brightness, or shape. In some embodiments, the first visible indicator can be a background image of the GUI in a first color hue, a first tone, or a first brightness, and the second visible indicator can be the background image in a second color hue, a second tone, or a second brightness.

In some embodiments, the GUI of the ambiguated application can further include one or more switching objects to switch the ambiguated application from the first state to the second state, or from the second state to the first state. In some embodiments, the one or more switching objects can switch the ambiguated application from one state selected from the first state, the second state, the third state, and the fourth state, to another state selected from the first state, the second state, the third state, and the fourth state. In order to switch the ambiguated application, the one or more switching objects can be activated by one or more control actions including taps, clicks, swipes, or gestures, or by a placement of a predetermined pattern formed by the one or more switching objects.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS/FIGURES

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

A general communication device, e.g., a smartphone, can include various communication applications as software so that the communication device can perform different kinds of communications. For example, a user can use a communication application, e.g., a push-to-talk (PTT) application, on a smartphone to perform some sensitive tasks, e.g., investigative tasks or law enforcement tasks. However, there may not be enough security protection for a direct implementation of a communication application for such tasks on a communication device. Data captured by the communication application for such sensitive tasks can be at risk when the communication device, e.g., a smartphone, is in the wrong hands. In the current disclosure, a communication device can also be referred to simply as a device.

Embodiments herein present increased security for the communication application. Instead of being in a direct and standalone manner, a communication application can be a part of an ambiguated application. In more detail, an ambiguated application can operate in different states to perform as different applications. For example, an ambiguated application can operate in a first state to perform as a communication application, and operate in a second state to perform as a game to be played on the communication device. The ambiguated application includes a graphical user interface (GUI) that is referred to as an ambiguated GUI and can be shared between the two states of the ambiguated application. The GUI can include a functional object. When the functional object is selected and the ambiguated application is in a first state, a first function can be performed. On the other hand, when the functional object is selected and the ambiguated application is in a second state, a second function can be performed.

Hence, embodiments herein enable the ambiguated application to operate in a dual function manner, where communication controls for the communication application are concealed through an ambiguated GUI from a third party's observational perspective. If the communication device is confiscated or commandeered by an unauthorized person, the communication application can appear to be a game since the same GUI is used by both the communication application and the game. Hence, the communication application may remain non-discoverable through interface use and interrogation. If the communication application is not discovered on the communication device, data captured by the communication application are more likely to be safe with reduced risk of being misused. As a result, the communication application can have increased security.

Figure 1:
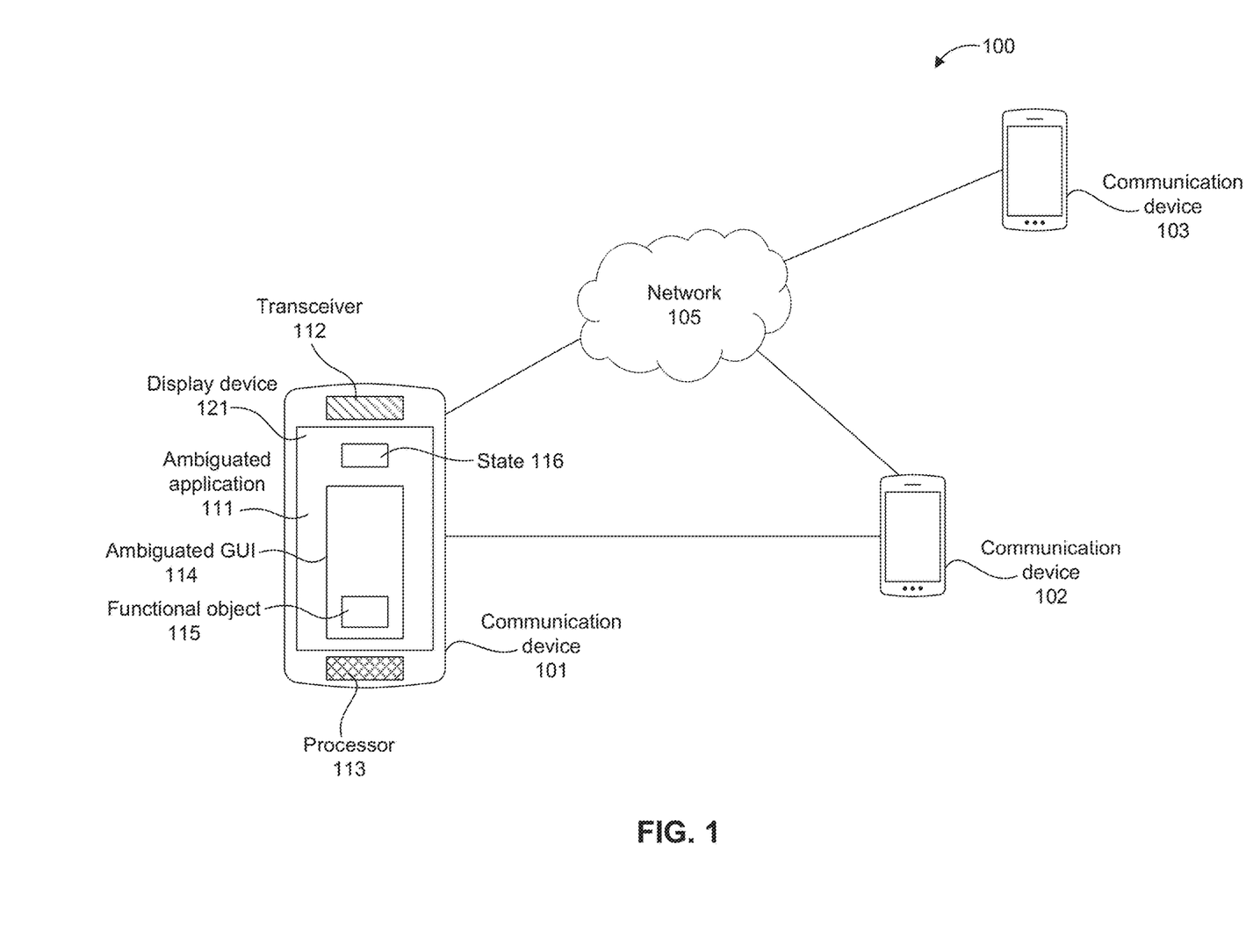
FIG. 1 illustrates a communication system including a communication device having an ambiguated application with an ambiguated graphic user interface (GUI), according to an example embodiment.
Figure 2:
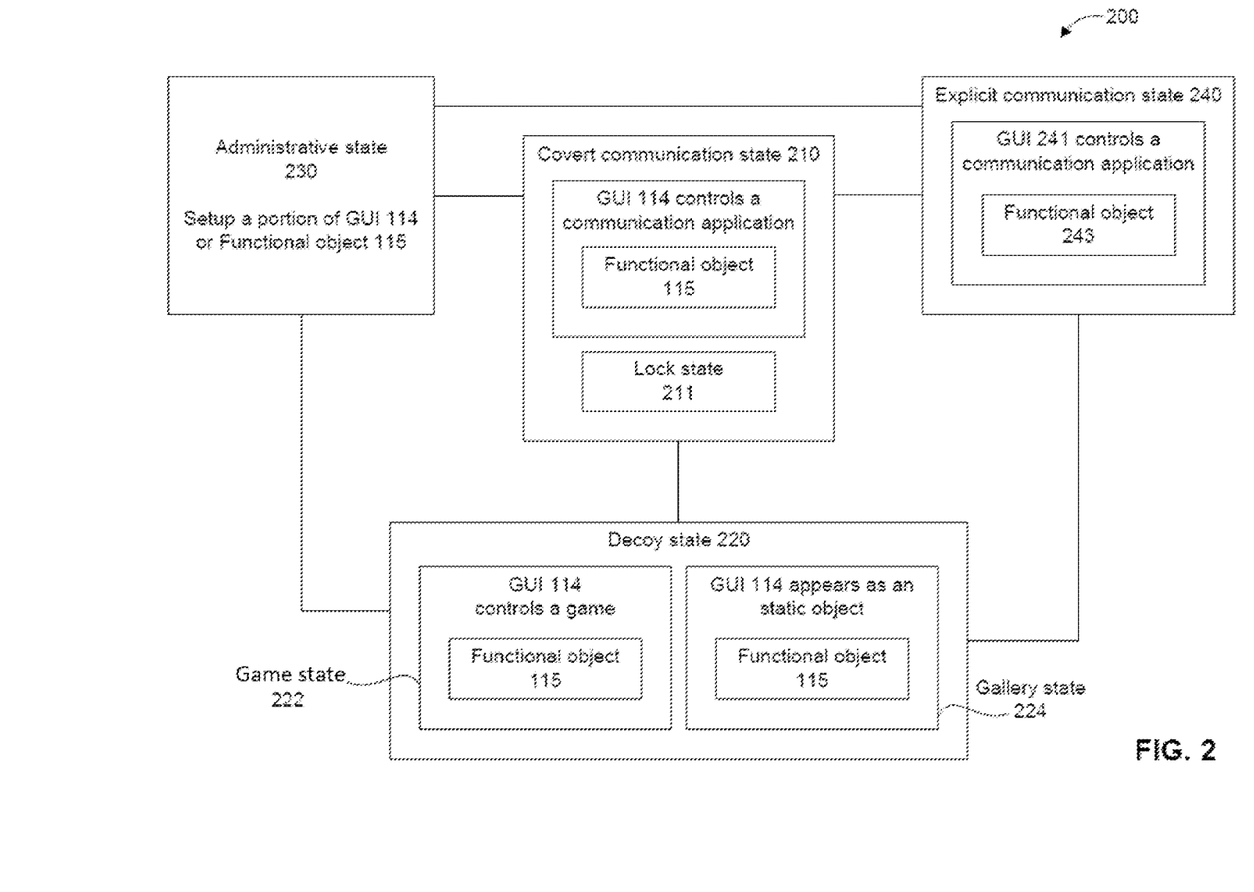
FIG. 2 illustrates a state diagram of various states for an example ambiguated application with an ambiguated GUI to be operated on a communication device, according to an example embodiment.
Figure 3:
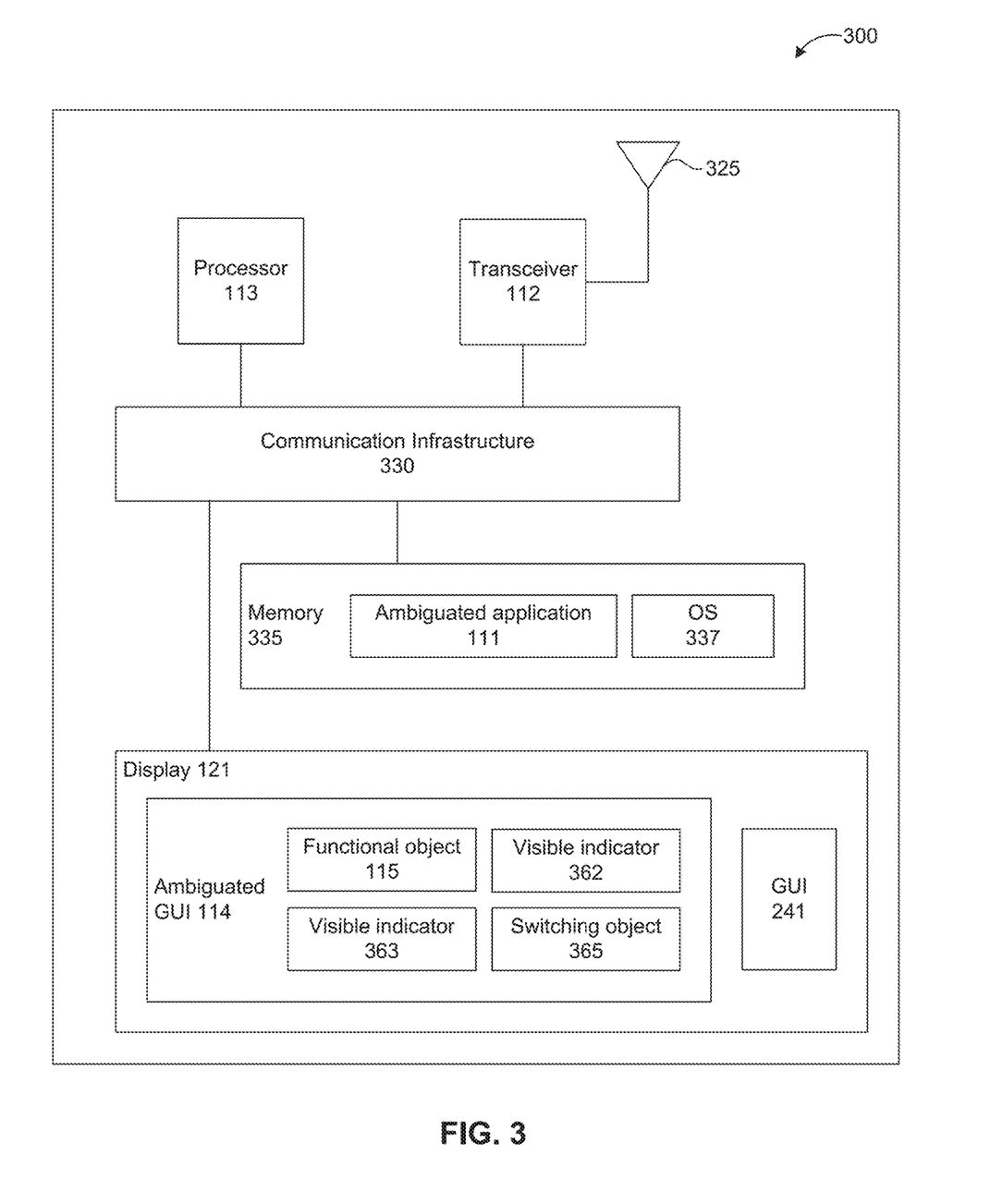
FIG. 3 illustrates a block diagram of an example communication device having an ambiguated application with an ambiguated GUI, according to an example embodiment.

FIG. 1 illustrates a communication system 100 including a communication device 101 having an ambiguated application 111 with an ambiguated GUI 114, according to an example embodiment. FIG. 2 illustrates a state diagram 200 of various states for state 116 of ambiguated application 111 with ambiguated GUI 114 to be operated on communication device 101. FIG. 3 illustrates a block diagram of communication device 300 having ambiguated application 111 with ambiguated GUI 114, where the device 300 can be an example of device 101.

In some embodiments, communication system 100 includes communication device 101, communication device 102, and communication device 103. Communication device 101 can wirelessly communicate with communication device 102, and communication device 103 through a wireless communication network 105. System 100 is only for illustration purposes and is not limiting. There can be other configurations for system 100. For example, wireless communication network 105 can include a wireless network having one or more base stations, not shown, through which communication device 101 and communication device 103 can communicate. In addition, there can be a direct wireless communication link between communication device 101 and communication device 102. Additionally and alternatively, communication device 101 can communicate with communication device 102 through a wireless base station, not shown.

In some embodiments, communication device 101 can include transceiver 112, processor 113, and display device 121. Ambiguated application 111 can be operated by processor 113 and shown on display device 121. Ambiguated application 111 further includes state 116, and ambiguated GUI 114, where ambiguated GUI 114 is displayed on display device 121 and includes at least functional object 115. Communication device 101 can further include other components, e.g., a memory, an operating system, and more, as shown in FIG. 3.

In some embodiments, transceiver 112 can be configured to communicate in wireless communication network 105. For example, wireless communication network 105 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular wireless network, a WiFi network, a WiMax network, any other type of network, or a combination of two or more such networks. The cellular wireless network can be based on 3rd Generation Partnership Project (3GPP) standards using Rel-16, Rel-17 or later.

In some embodiments, communication device 101 and communication device 102 can be in a wireless communication network, e.g., an ad hoc wireless network, a communication talk group, or a mobile PTT group. In addition, communication device 101 and communication device 103 can be in a wireless communication network that is the same as or different from the wireless communication network for communication device 101 and communication device 102.

In some examples, communication device 101 can be a wireless communication device, smart phone, a laptop, a tablet, a desktop computer, a server, a personal assistant, a monitor, a wearable device, an Internet of Thing (IoT) device, a mobile station, a subscriber station, a remote terminal, a wireless terminal, or a user device.

In some embodiments, ambiguated application 111 includes ambiguated GUI 114 having functional object 115 displayed on display device 121. Functional object 115 can include a symbol, a shape, a color, an image, an area defined by a shape transparent or invisible to a human, an area visually bounded by a visible line with a transparent interior, or an area that has no visible line boundary with a transient or semitransparent interior. In addition, functional object 115 can be controlled by a touch or a gesture of a user. More examples of ambiguated GUI 114 and functional object 115 are shown in FIGS. 4A, 4B, 5A, 5B, 6A, and 6B.

FIG. 2 illustrates state diagram 200 of various states for state 116 of ambiguated application 111 with an ambiguated GUI 114 operating on communication device 101, according to an example embodiment. In some embodiments, when functional object 115 is selected, processor 113 can be configured to perform a first function if the ambiguated application is in a first state. In some embodiments, the first state can be covert communication state 210, as shown in FIG. 2. While in covert communication state 210, ambiguated application 111 can perform as a communication application, and the first function can be a control function for the communication application to manage a communication between communication device 101 and another device, e.g., communication device 102. For example, the first function can include a photo capture function, a video recording function, an audio recording function, a sending function, a receiving function, a muting audio function, a push to talk voice communication control function, or any other communication or control functions.

Figure 4A:
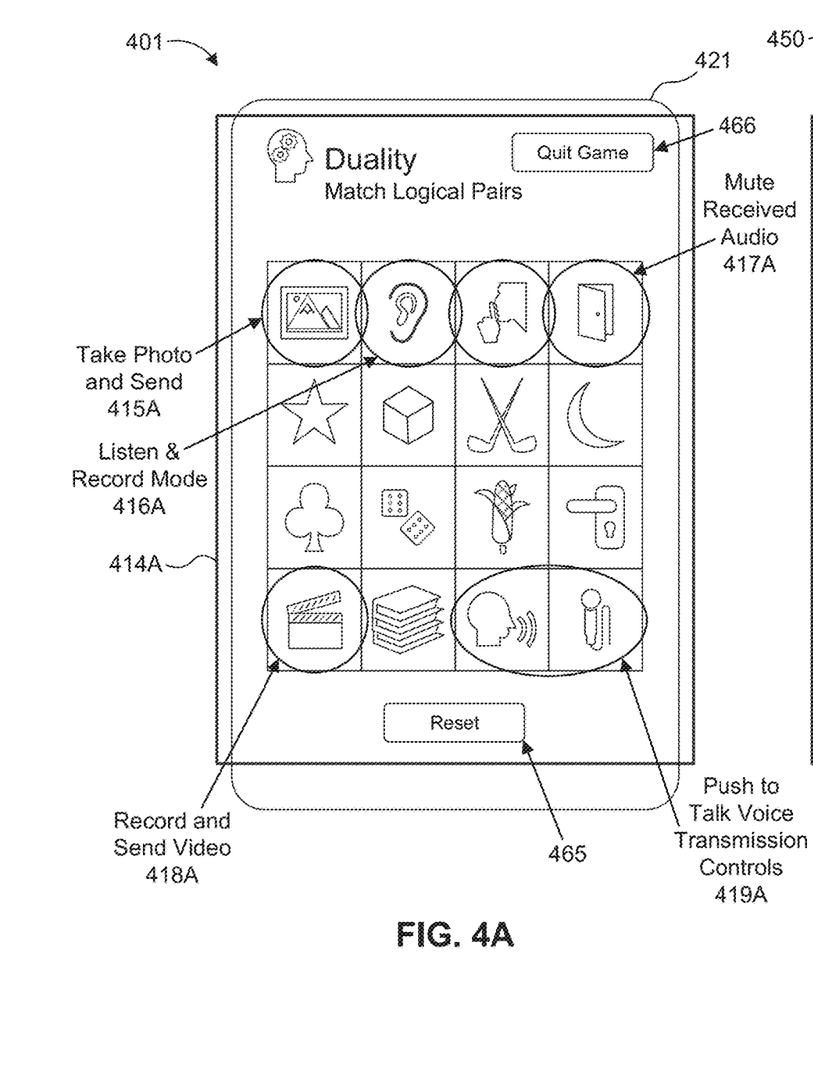
FIGS. 4A-4B illustrate an example ambiguated GUI for an ambiguated application, according to an example embodiment.
Figure 4B:
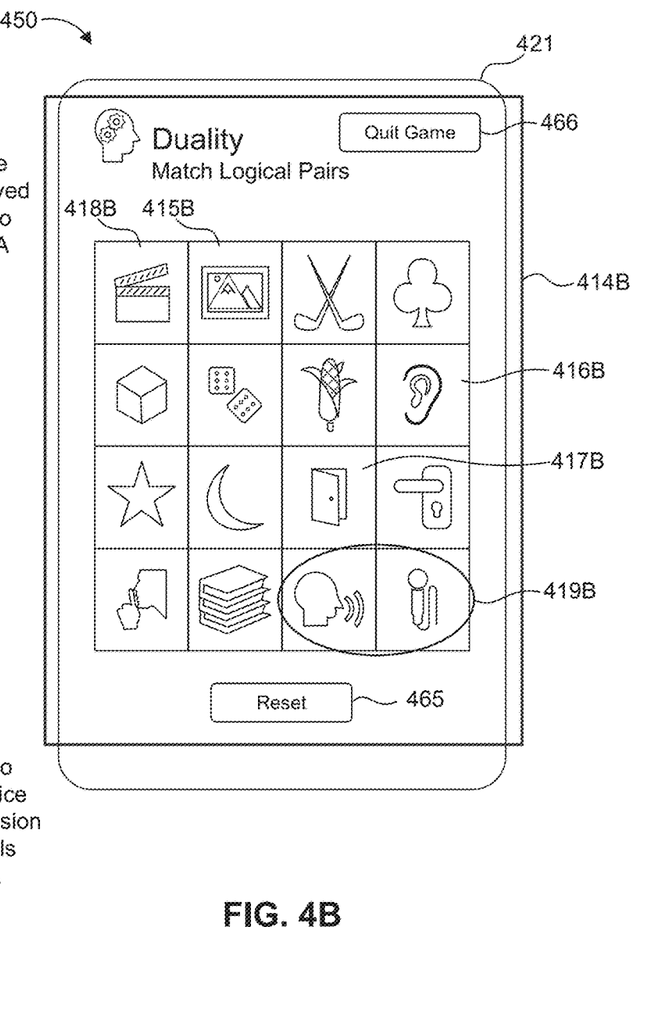

In some embodiments, when functional object 115 is selected, processor 113 can be configured to perform a second function or represent an object if ambiguated application 111 is in a second state. For example, the second state can be decoy state 220, which includes game state 222 or gallery state 224. When ambiguated application 111 is in game state 222, ambiguated application 111 can perform as a game to be played on communication device 101, and the second function represents a function of the game. More details of such functional object 115 are shown in FIGS. 4A-4B. Additionally and alternatively, decoy state 220 can be an application other than a game. For example, decoy state 220 can be in gallery state 224, where ambiguated application 111 can represent one or more images. The object represented by functional object 115 includes a portion of the one or more images. More details of such functional object 115 are shown in FIGS. 5A-5B, 6A-6B, and 7B.

In some embodiments, ambiguated application 111 can be in state 116, which may be any state of multiple states depicted in state diagram 200. State 116 can be the first state, e.g., covert communication state 210, and the second state, e.g., decoy state 220 that includes game state 222, or gallery state 224, as shown above. A state may be referred to as a mode, a configuration, or other similar terms.

FIG. 2 illustrates state diagram 200 of various states of ambiguated application 111 with an ambiguated GUI 114 operating on communication device 101, according to an example embodiment. In some embodiments, state 116 of ambiguated application 111 can be any state of state diagram 200. A first state can be covert communication state 210, while a second state can be decoy state 220 that includes game state 222, or some other state such as gallery state 224. When state 116 is in covert communication state 210, ambiguated application 111 can perform as a first application, e.g., a communication application, with functions controlled by ambiguated GUI 114. Within covert communication state 210, there can be lock state 211 for the communication application. Lock state 211 can be activated by one or more functional objects of ambiguated GUI 114. When state 116 is in lock state 211, ambiguated application 111 can perform as the communication application, but the communication application is not operative, e.g., paused. The communication application can be unlocked from lock state 211 by one or more functional objects of the ambiguated GUI 114 or by a security code to unlock the communication application. For example, ambiguated application 111 can enter a lock state, e.g., state 116 can change to lock state 211 by a series or a combination of symbols on ambiguated GUI 114 being placed in a predetermined way.

In some embodiments, when state 116 is in decoy state 220, e.g., game state 222, ambiguated application 111 can perform as a second function, e.g., a game to be played on communication device 101 and controlled by ambiguated GUI 114. Alternatively, state 116 can be in gallery state 224 where ambiguated GUI 114 represents one or more images, or appears as a static object without any functionality.

In some embodiments, state 116 can enter a third state, which can be administrative state 230 where processor 113 can be configured to setup or provision a portion of ambiguated GUI 114 or functional object 115.

In addition, state 116 can enter a fourth state, which can be explicit communication state 240. When state 116 is in explicit communication state 240, ambiguated application 111 can include GUI 241 that controls ambiguated application 111 to perform as the communication application. In some embodiments, GUI 241 can have substantially the same functions as represented by ambiguated GUI 114. In some embodiments, GUI 241 can have functions that are different from those represented by ambiguated GUI 114. For example, GUI 241 can have functional object 243 that represents a same function as functional object 115 of covert communication state 210.

State diagram 200 shown in FIG. 2 is only for illustration purposes and is not limiting. There can be other states not shown in FIG. 2. For example, ambiguated application 111 can be in a default state or start state when ambiguated application 111 is loaded and ambiguated GUI 114 is first displayed. A start state or default state can be any of the states shown in FIG. 2, or can be a different state not shown in FIG. 2. State 116 may enter other states, e.g., a control state, a low power state, or a secure state not shown in state diagram 200.

State 116 can enter different states for ambiguated application 111 to perform or act as different applications, e.g., perform all functions to a user as a communication application while in covert communication state 210, or perform all functions as a game in game state 222. Such ambiguated application 111 is different from having two different, independent, and standalone applications, e.g., the communication application and the game application. An application, or an application software, is managed by an operating system of the communication device. The operating system starts an application by creating a process for the application and allocating a memory space for the application. Two standalone applications, e.g., the communication application and the game, may be installed on a communication or computing device separately, and each performs its intended function. The operating system of the communication device manages the two independent applications as two separate processes in two separated allocated memory spaces. In contrast, ambiguated application 111 is managed by the operating system as one process in one allocated memory space. Ambiguated application 111 can perform two sets of functionalities, one set of functionalities for the communication application, and another set of functionalities for the game application. When ambiguated application 111 performs as a communication application, ambiguated application 111 can perform all the functionalities of the communication application. When ambiguated application 111 performs as a game, ambiguated application 111 can perform all the functionalities game. In addition, ambiguated application 111 performing as a communication application and ambiguated application 111 performing as a game are still one application in two different states instead of two standalone applications. By doing so, as one application, ambiguated application 111 has improved functionalities compared to the standalone communication application or standalone game, and hence improving the computing and communication technologies. Furthermore, switching ambiguated application 111 from performing as a communication application in covert communication state 210 to performing as a game in game state 222 is faster than switching from a standalone communication application to a standalone game. In addition, ambiguated application 111 provides improved security protection for the user of the communication application and data captured by the communication application by enabling state 116 to be switched to decoy state 220.

FIG. 3 illustrates a block diagram of communication device 300. As a convenience and not a limitation, communication device 300 may be described with elements from other figures in the disclosure. For example, communication device 300 can represent communication device 101, 102, and/or 103 of FIG. 1. Communication device 300 may include processor 113, transceiver 112, communication infrastructure 330, memory 335, display device 121, and antenna 325 that together perform operations enabling communication device 300 to perform ambiguated control functions for covert communications. Transceiver 112 transmits and receives wireless communications signals via antenna 325. Communication infrastructure 330 may be a bus. Memory 335 may include random access memory (RAM) and/or cache, and may include control logic (e.g., computer software such as ambiguated application 111 and operating system 337), computer instructions, and/or data. Processor 113, upon execution of the computer instructions, can be configured to perform the functionality described herein for operating ambiguated application 111. In some embodiments, processor 113 can include its own internal memory (not shown), and/or be "hard-wired" (as in a state-machine) configured to perform the functionality described herein for operating ambiguated application 111. Antenna 325 coupled to transceiver 112, may include one or more antennas and/or panels (not shown) that may be the same or different types to enable wireless communication over a wireless network. In some embodiments transceiver 112 may transmit and receive signals via a wired network (not shown.)

In some embodiments, processor 113 can be configured to operate ambiguated application 111 to display ambiguated GUI 114 on display device 121. Ambiguated GUI 114 includes functional object 115. In addition, ambiguated GUI 114 further includes visible indicator 362 to indicate that the ambiguated application is in a first state, and visible indicator 363 to indicate that the ambiguated application is in a second state. Visible indicator 362 and visible indicator 363 can differ in color hue, tone, brightness, or shape. For example, visible indicator 362 can include a background image of ambiguated GUI 114 in a first color hue, a first tone, or a first brightness, and visible indicator 363 can include the background image in a second color hue, a second tone, or a second brightness. More details of visible indicator 362 and visible indicator 363 are shown in FIGS. 5A-5B, and 6A-6B.

In some embodiments, ambiguated GUI 114 further includes one or more switching objects 365 to switch ambiguated application 111 from one state to another. To switch ambiguated application 111, one or more switching objects 365 are activated by one or more control actions including taps, clicks, swipes, or gestures, or by a placement of a predetermined pattern formed by one or more switching objects 365. More details of ambiguated GUI 114 are described with regard to FIGS. 4A-4B, 5A-5B, and 6A-6B below.

In some embodiments, ambiguated application 111 can further include a second GUI, GUI 241, with substantially the same functions as represented by ambiguated GUI 114. GUI 241 can be active when ambiguated application 111 is in explicit communication state 240 as shown in FIG. 2.

In some embodiments, FIG. 4A illustrates example ambiguated GUI 414A for an ambiguated application, according to an example embodiment. Device 401 includes a display device 421 to display ambiguated GUI 414A for an ambiguated application, e.g., ambiguated application 111. Device 401, display device 421, and ambiguated GUI 414A can be examples of device 101, display device 121, and ambiguated GUI 114, respectively, when state 116 is in covert communication state 210 as described in FIGS. 1-3.

In some embodiments, ambiguated GUI 414A includes various functional objects, e.g., functional object 415A, functional object 416A, functional object 417A, functional object 418A, and functional object 419A. Each of the functional objects includes one or more symbols, and can represent different functions when ambiguated application 111 is in a different state. For example, functional object 415A, functional object 416A, functional object 417A, functional object 418A each include one symbol, and functional object 419A includes two symbols. In addition, ambiguated GUI 414A includes a switching object 465 and a switching object 466, which are symbols. Each functional object or switching object can be controlled by a touch or a gesture of a user.

In some embodiments, as shown in FIG. 4A, state 116 of ambiguated application 111 is in a first state or covert communication state 210 shown in FIG. 2. Accordingly, ambiguated GUI 414A illustrates ambiguated GUI 114 with control functions for a communication application. For example, functional object 415A represents a function of taking a photo and sending the photo by the communication application; functional object 416A represents a function of listening and recording; functional object 417A represents a function of muting received audio; functional object 418A represents a function of recording a video and sending; functional object 419A represents a function of push to talk voice transmission control. Additional symbols in ambiguated GUI 414A are not described, and may represent various additional functions, e.g., a photo capture function, a video recording function, an audio recording function, a sending function, a receiving function, a muting audio function, a push to talk voice communication control function, or other functions used in a communication application or multimedia application.

In some embodiments, as shown in FIG. 4B, device 450 includes a display device 421 to display ambiguated GUI 414B for an ambiguated application, e.g., ambiguated application 111. Device 450 can be the same as device 401. As shown in FIG. 4B, state 116 of ambiguated application 111 can be in a second state or decoy state 220, e.g., game state 222 shown in FIG. 2. Ambiguated GUI 414B illustrates ambiguated GUI 114 in game state 222 with control functions for a game played on device 401. For example, ambiguated GUI 414B can represent a puzzle game, and functional objects 415B, 416B, 417B, 418B, and 419B can be moved around to form certain patterns in a game, e.g., a matching game. Functional objects 415B, 416B, 417B, 418B, and 419B are the same functional objects as 415A, 416A, 417A, 418A, and 419A of ambiguated GUI 414A, as shown in FIG. 4A, but represent different functions, e.g., a game object function. For example, functional object 415 can perform two functions: perform as functional object 415A to take and send photos in covert communication state 210; and perform as functional object 415B as a game piece of a matching game in game state 222. As shown in FIG. 4B, functional object 415B, 416B, 417B, and 418B can be moved to different locations at ambiguated GUI 414B, as a user is playing the game. In some embodiments, the game in game state 222 includes a user identity that is associated with a user identity of the communication application when state 116 of ambiguated application 111 in covert communication state 210.

In some embodiments, ambiguated GUIs 414A and 414B include switching object 465 and switching object 466. Switching object 465 can represent a reset function so that ambiguated application 111 can return to a default state, which can be any one of covert communication state 210, decoy state 220, game state 222, gallery state 224, administrative state 230, or explicit communication state 240 as shown in FIG. 2. Switching object 466 can represent a switch from game state 222 to covert communication state 210, gallery state 224, or another state. In some embodiments, a placement of one or more functional objects 415A, 416A, 417A, 418A, and/or 419A can perform a switch function to another state, e.g., game state 222.

Ambiguated GUI 414A and ambiguated GUI 414B shown in FIGS. 4A-4B are just one example. In some embodiments, ambiguated application 111 can have a first GUI when ambiguated application 111 is in a first state, and have a second GUI when ambiguated application 111 is in a second state, where the first GUI and the second GUI share at least one common functional object.

Figure 5A:
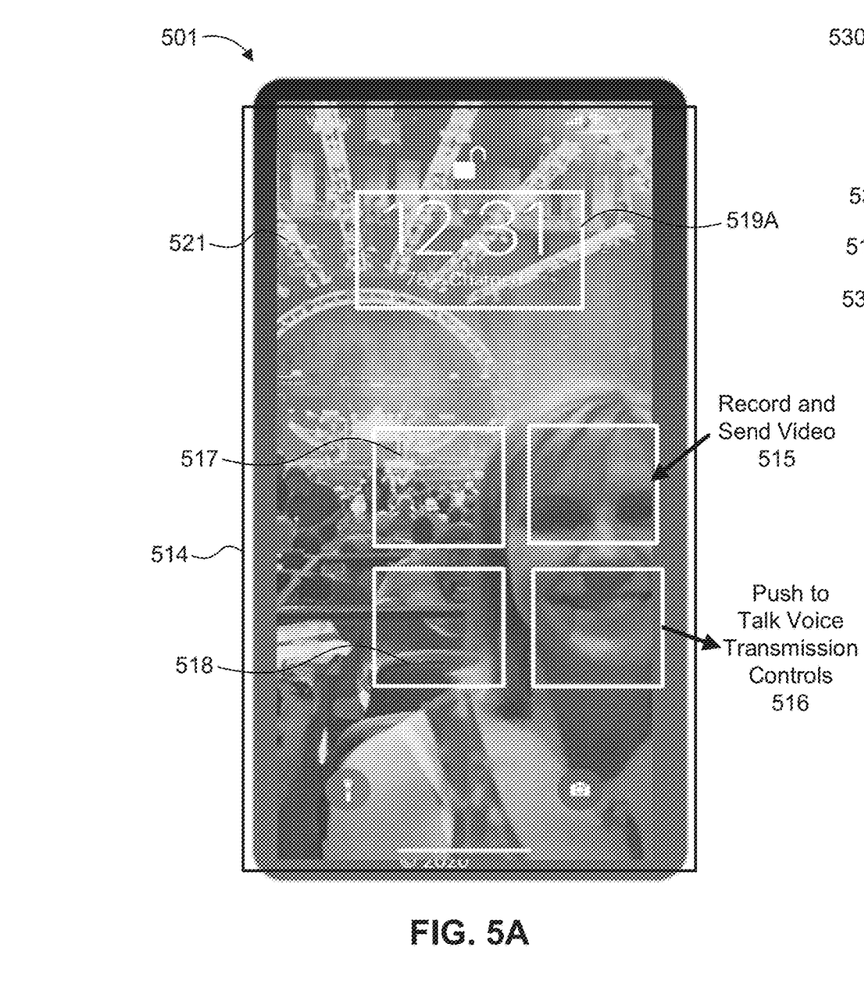
FIGS. 5A-5B illustrate another example ambiguated GUI for an ambiguated application, according to an example embodiment.
Figure 5B:
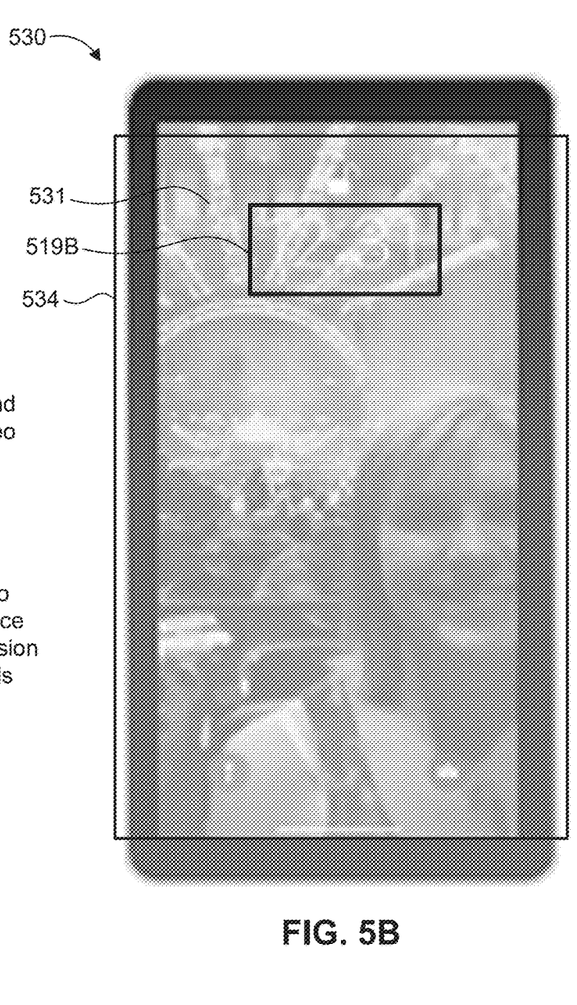

In some embodiments, FIGS. 5A-5B illustrate example ambiguated GUIs 514 and 534 respectively, for an ambiguated application, according to an example embodiment. Device 501 includes a display device 521 to display ambiguated GUI 514 for an ambiguated application, e.g., ambiguated application 111. Device 501, display device 521, and ambiguated GUI 514 can be examples of device 101, display device 121, and ambiguated GUI 114, respectively, as described in FIGS. 1-3.

In some embodiments, ambiguated GUI 514 includes various functional objects, e.g., functional object 515, functional object 516, functional object 517, and functional object 518; and switching object 519. Each of the functional objects can represent different functions when ambiguated application 111 is in a different state. Each of the functional objects is not a symbol as shown in FIGS. 4A-4B. Instead, functional object 515 is a shape around the eyes of a person in a background image; functional object 516 is a shape around the mouth of the person in the background image; functional object 517 is a shape next to functional object 515; and functional object 518 is a shape next to functional object 516. The shapes for functional object 515, functional object 516, functional object 517, and functional object 518 are shown as a rectangular shape. In some other embodiments, a functional object can be any other shape. In some embodiments the outline for a functional object, e.g., functional object 515, may not be visible in ambiguated GUI 514. Instead, the outline for functional object 515 or any other functional object may be drawn for illustration purposes. A functional object can be a shape, a color, an image, an area defined by a shape transparent or invisible to a human, an area visually bounded by a visible line with a transparent interior, or an area that has no visible line boundary with a transient or semitransparent interior. The functional object can be controlled by a touch or a gesture of a user.

In some embodiments, as shown in FIG. 5A, ambiguated application 111 is in a first state, e.g., as covert communication state 210 shown in FIG. 2. Ambiguated GUI 514 is used to represent control functions when ambiguated application 111 performs as a communication application. For example, functional object 515 can represent a function of recording and sending video, corresponding to the function of a human eye for the person in a background image. Functional object 516 can represent a function of PTT transmission control, corresponding to the function of human mouth for the person in a background image. Additional functional objects can be defined for various functions, e.g., a photo capture function, a video recording function, an audio recording function, a sending function, a receiving function, a muting audio function, a push to talk voice communication control function, or other functions used in a communication application or multimedia application. A functional object can be a portion of the one or more images in the background image or other images of ambiguated GUI 514.

In some embodiments, as shown in FIG. 5B, a device 530 includes display device 531 to display ambiguated GUI 534 for an ambiguated application, e.g., ambiguated application 111. Device 530, display device 531, and ambiguated GUI 534 can be examples of device 101, display device 121, and ambiguated GUI 114, respectively, as described in FIGS. 1-3. In addition, device 530 and display device 531 are the same as device 501 and display device 521 of FIG. 5A, respectively.

As shown in FIG. 5B, ambiguated application 111 is in a second state, e.g., gallery state 224 as shown in FIG. 2, to represent one or more images. Ambiguated application 111 presents one or more images, e.g., a background image of ambiguated GUI 514. In gallery state 224, each of the functional objects as described in FIG. 5A does not represent any function in FIG. 5B. Instead, each of the functional objects can be replaced by a portion of one or more images. In some embodiments, a functional object can be replaced by an object. In contrast to a function, which performs operations by the processor, a functional object can represent an object without performing any operation in the second state (e.g., gallery state 224.)

In some embodiments, ambiguated GUI 514 in FIG. 5A includes switching object 519A, which is shown as around the time "12:31" on ambiguated GUI 514, and further shown as 519B in FIG. 5B. Switching object 519A can be a shape, a color, an image, an area defined by a shape transparent or invisible to a human, an area visually bounded by a visible line with a transparent interior, or an area that has no visible line boundary with a transient or semitransparent interior. Switching object 519A can switch ambiguated application 111 from gallery state 224 to covert communication state 210, or from covert communication state 210 to gallery state 224.

In some embodiments, ambiguated GUI 514 further includes a first visible indicator to indicate that ambiguated application 111 is in the first state, e.g., covert communication state 210, and a second visible indicator to indicate that ambiguated application 111 is in the second state, e.g., gallery state 224. The first visible indicator includes the background image of ambiguated GUI 514 in a first color hue, a first tone, or a first brightness, as shown in FIG. 5A. Similarly, the second visible indicator includes the background image in a second color hue, a second tone, or a second brightness, as shown in FIG. 5B.

Figure 6A:
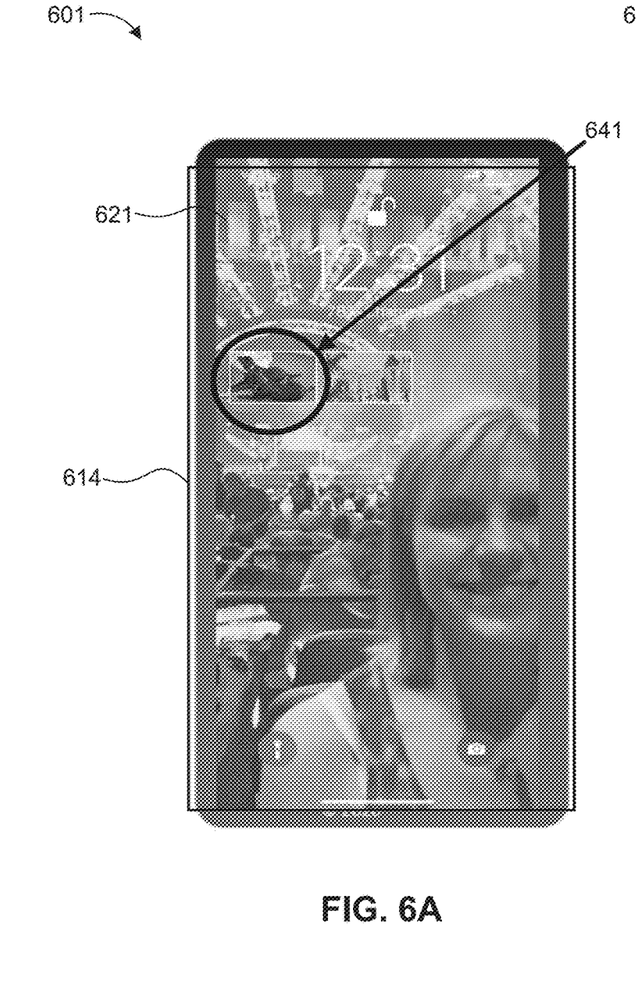
FIGS. 6A-6B illustrate another example ambiguated GUI for an ambiguated application, according to an example embodiment.
Figure 6B:
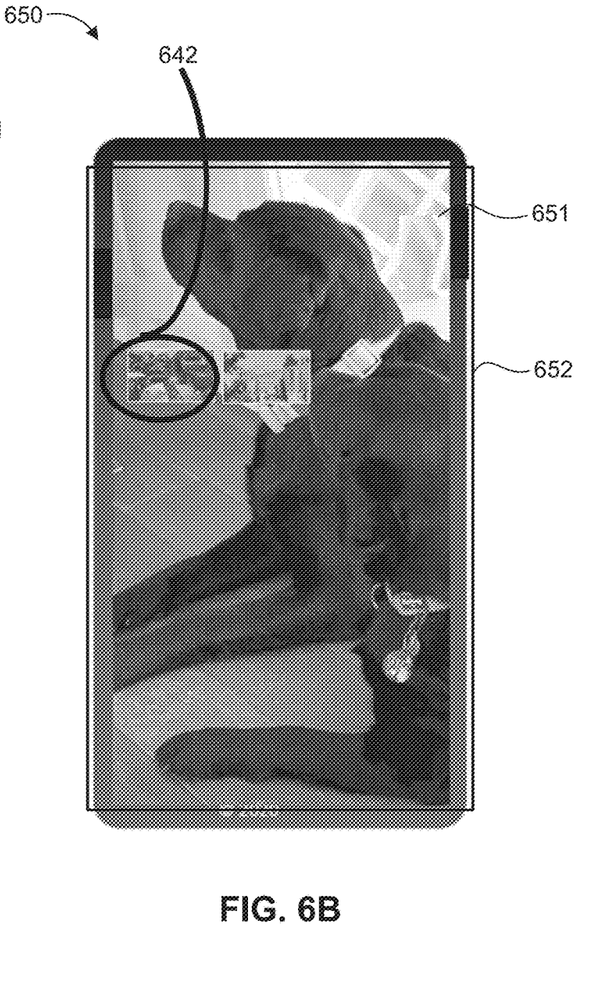

In some embodiments, FIGS. 6A-6B illustrate example ambiguated GUIs 614 and 652 respectively, for an ambiguated application, according to an example embodiment. As shown in FIG. 6A, device 601 includes a display device 621 to display ambiguated GUI 614 for an ambiguated application, e.g., ambiguated application 111. Device 601, display device 621, and ambiguated GUI 614 can be examples of device 101, display device 121, and ambiguated GUI 114, respectively, as described in FIGS. 1-3. As shown in FIG. 6B, device 650 includes a display device 651 to display ambiguated GUI 652 for an ambiguated application, e.g., ambiguated application 111. Device 650, display device 651, and ambiguated GUI 652 can be examples of device 101, display device 121, and ambiguated GUI 114, respectively, as described in FIGS. 1-3. In addition, device 650 and display device 651 can be the same as device 601 and display device 621 as shown in FIG. 6A, respectively.

In some embodiments, ambiguated GUI 614 includes a person's image as a background. Ambiguated GUI 614 can be the same as ambiguated GUI 514 shown in FIG. 5A, ambiguated GUI 652 can be similar to ambiguated GUI 614, performing similar functions as ambiguated GUI 614. On ambiguated GUI 614, a switching object 641 can switch ambiguated GUI 614 to ambiguated GUI 652. Similarly, on ambiguated GUI 652, a switching object 642 can switch ambiguated GUI 652 to ambiguated GUI 614. Ambiguated GUI 652 and ambiguated GUI 614 can be used to control different communications. Ambiguated GUI 652 and ambiguated GUI 614 can provide more flexible control to manage more communication groups for ambiguated application 111. Ambiguated GUI 614 can be associated with a first communication group, and ambiguated GUI 652 can be associated with a second communication group. For example, ambiguated GUI 614 can be used to control communication among a first PTT group, and ambiguated GUI 652 can be used to control communication among a second PTT group. A user can switch the communication group by simply switching the screen for controlling the communication groups.

Figure 7A:
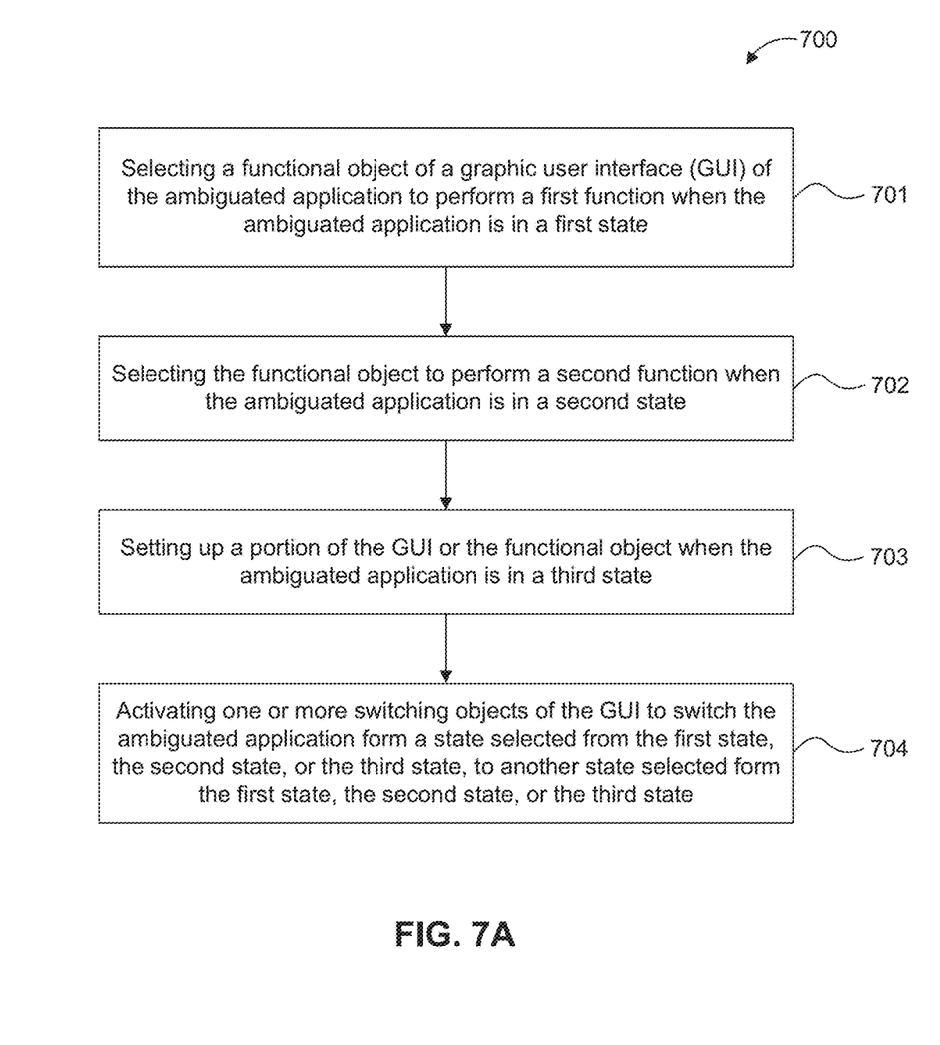
FIGS. 7A-7B illustrate methods performed by an ambiguated application with an ambiguated GUI, according to an example embodiment.
Figure 7B:
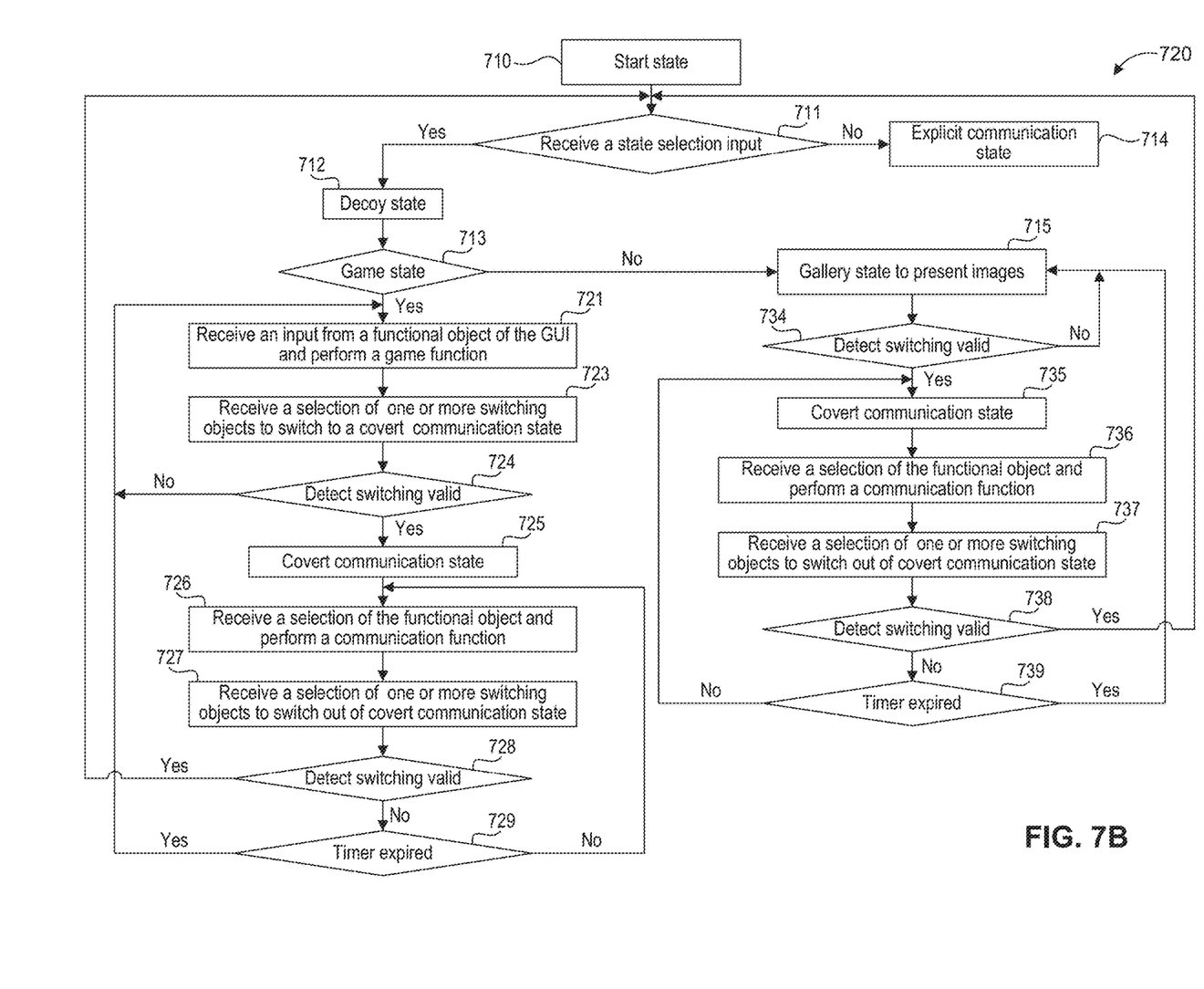

FIGS. 7A-7B illustrate methods, e.g., method 700 and method 720, performed by an ambiguated application with an ambiguated GUI, according to an example embodiment. As a convenience and not a limitation, method 700 and method 720 may be described with elements of FIGS. 1-3, 4A, 4B, 5A, 5B, 6A, and 6B. For example, method 700 or method 720 can be performed by one or more processors 113 executing ambiguated application 111, or system 800 described below.

FIG. 7A shows the details for method 700. At 701, when ambiguated application 111 is in a first state, ambiguated application 111 can select a functional object of a GUI of ambiguated application 111 to perform a first function. For example, as shown in FIG. 4A, at the covert communication state 210, ambiguated application 111 performs as a communication application, and in response to receiving input from a user, can select functional object 415A of ambiguated GUI 414A to perform a function of taking a photo and sending the photo for the communication application.

At 703, when ambiguated application 111 is in a second state, ambiguated application 111 can select the functional object to perform a second function. For example, as shown in FIG. 4B, at game state 222, ambiguated application 111 performs as a game to be played on device 401, and can select functional object 415B of ambiguated GUI 414B to perform a function for the game.

At 705, when ambiguated application 111 is in a third state, ambiguated application 111 can setup a portion of the GUI or the functional object. For example, when ambiguated application 111 is in administrative state 230, ambiguated application 111 can setup a portion of ambiguated GUI 414A or functional object 415A.

At 707, ambiguated application 111 can activate one or more switching objects of the GUI to switch the ambiguated application from a state selected from a first state, a second state, a third state, or a fourth state, to another state selected from the first state, the second state, the third state, or the fourth state. For example, ambiguated application 111 can activate one or more switching objects of ambiguated GUI 414A, ambiguated GUI 514, or ambiguated GUI 614, to switch ambiguated application 111 from a state to another state.

FIG. 7B shows the details for method 720. Method 720 can be viewed as a more detailed implementation of method 700. Method 720 is only one way to implement method 700, and there can be many more ways to implement method 700 having different operations or organizing operations in different order than those shown in method 720.

At 710, ambiguated application 111 can be in a start state, which may be a default state for ambiguated application 111. The start state can be any one of covert communication state 210, decoy state 220, game state 222, gallery state 224, administrative state 230, or explicit communication state 240, as shown in FIG. 2, or a state not shown.

At 711, a determination is made whether ambiguated application 111 receives a state selection input to select a state. For example, ambiguated application 111 can receive an input from a user to select one state among covert communication state 210, decoy state 220, game state 222, gallery state 224, administrative state 230, or explicit communication state 240. When no input is received by ambiguated application 111, method 720 proceeds to 714. Otherwise, method 720 proceeds to 712.

At 714, when no input is received, ambiguated application 111 enters explicit communication state 240, where ambiguated application 111 performs communication functions controlled by GUI 241.

At 712, when input is received, ambiguated application 111 enters decoy state 220.

At 713, a determination is made whether ambiguated application 111 enters a game state, e.g., game state 222 and proceeds to 721, or a gallery state, e.g., gallery state 224, and proceeds to 715, based on the received input.

At 721, when ambiguated application 111 is at game state 222, ambiguated application 111 can receive an input from a functional object of the GUI to perform a game function. For example, at game state 222 as shown in FIG. 4B, ambiguated application 111 can receive an input from functional object 415B of the ambiguated GUI 414B to perform a game function.

At 723, when ambiguated application 111 is at game state 222, ambiguated application 111 can receive a selection of one or more switching objects to switch to covert communication state 210 to perform communication functions. For example, at game state 222 as shown in FIG. 4B, ambiguated application 111 can receive an input from switching object 466 to quit the game. In some embodiments ambiguated application 111 can receive a placement of one or more functional objects, e.g., 415A and 418A, to switch to another state as shown in FIG. 2.

At 724, ambiguated application 111 may determine whether the selection of switching objects or placement of functional objects is valid or not by testing a predetermined security condition. When the selection of switching objects satisfies a predetermined security condition, method 720 proceeds to 725. Otherwise, method 720 returns to 721 to remain operating in game state 222.

At 725, ambiguated application 111 can enter covert communication state 210, and can perform a communication application function.

At 726, at covert communication state 210, ambiguated application 111 can receive a selection of the functional object and perform a communication function. For example, at covert communication state 210 as shown in FIG. 4A, ambiguated application 111 performing as a communication application can receive an input from functional object 415A of the ambiguated GUI 414A to perform a function of taking a photo and sending for the communication application.

At 727, ambiguated application 111 can receive a selection of one or more switching objects to switch out of covert communication state 210. For example, at covert communication state 210 as shown in FIG. 4A, ambiguated application 111 can receive an input from switching object 465 to reset ambiguated application 111 and hence switch out of covert communication state 210.

At 728, ambiguated application 111 may determine whether the selection of switching objects satisfying a predetermined security condition or not. When the selection of switching objects satisfies a predetermined security condition, ambiguated application 111 returns to 711 to receive input regarding the next state to enter. Otherwise, ambiguated application 111 remains at covert communication state 210 and method 720 proceeds to 729.

At 729, ambiguated application 111 may determine whether a timer is expired or not, where the timer is used to track the time ambiguated application 111 is in covert communication state 210. When the timer expires, ambiguated application 111 automatically switches out of covert communication state 210 and returns to 721 and enters game state 222. By automatically switching out of covert communication state 210 when the timer expires, ambiguated application 111 can have increased security, and avoid being discovered by unauthorized person when the user forgets to switch off covert communication state 210. When the timer has not expired, ambiguated application 111 can return to 726 and remain in covert communication state 210.

The above sequence of operations are related to 713 when ambiguated application 111 is in game state 222 and related to 725 when ambiguated application 111 is in covert communication state 210. Alternatively, ambiguated application 111 can be in gallery state 224, as indicated at 715.

At 715, at gallery state 224, ambiguated application 111 may present one or more images or photos, as shown in FIG. 5B.

At 734, ambiguated application 111 may determine whether an input from a user to switch to convert communication state 210 is valid. For example, ambiguated application 111 can determine whether the received input is valid or not by testing a predetermined security condition. Operations performed at 734 can be similar to operations performed at 724. Similarly, following 734, operations performed at 735, 736, 737, 738, and 739 are similar to operations performed at 725, 726, 727, 728, and 729, respectively, as described above.

System Implementation

Figure 8:
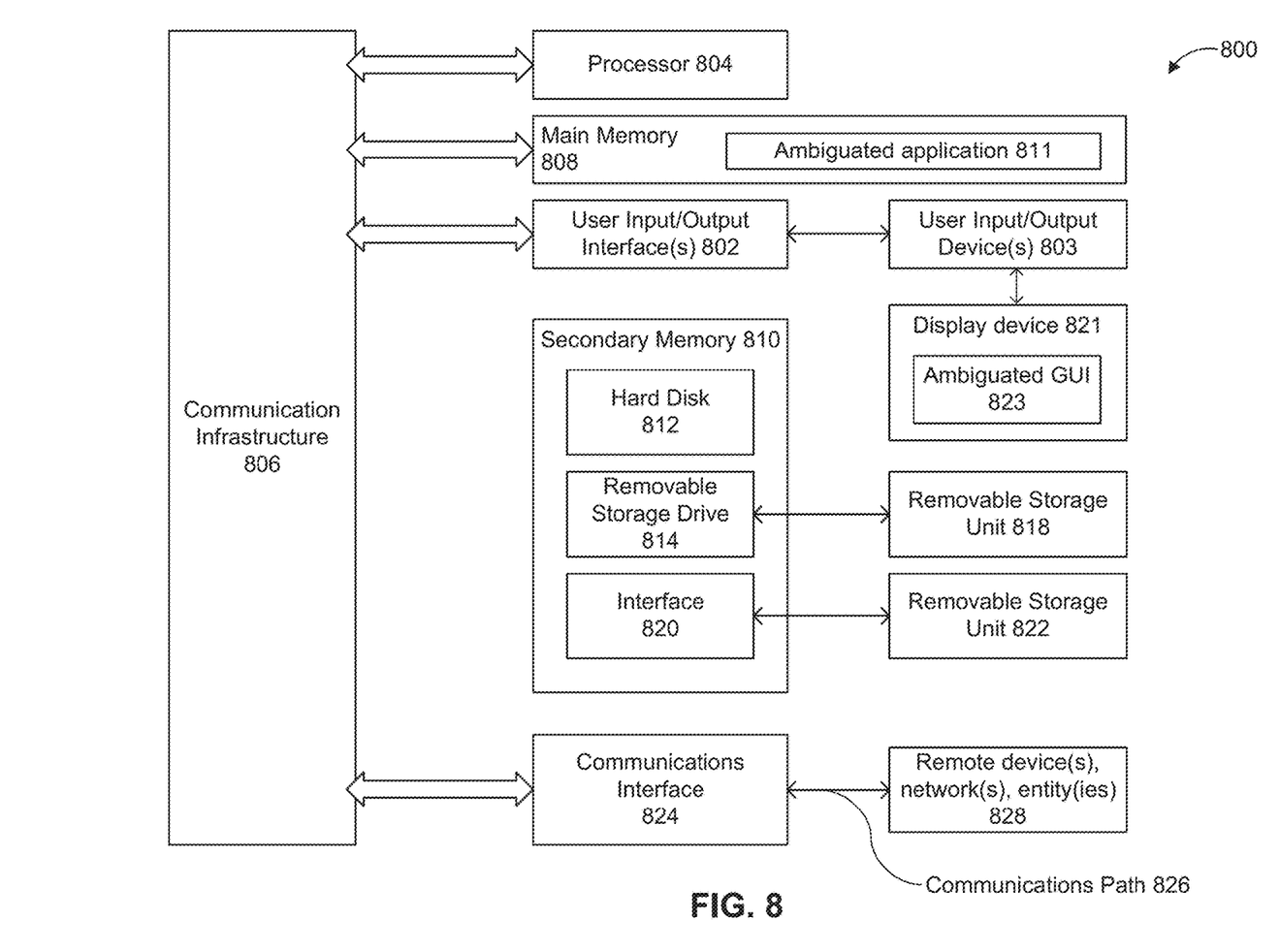
FIG. 8 is a diagram of an example computing system, according to an example embodiment.

Various embodiments can be implemented, by software, firmware, hardware, or a combination thereof. FIG. 8 illustrates and example computer system 800 in which the systems and devices described within various embodiments can be implemented as computer-readable code and/or textreadable code. After reading this description, it will become apparent to a person skilled in the relevant art how to implement the embodiments using other systems and/or processing architectures. For example, a communication device having an ambiguated application with an ambiguated GUI, as shown in previous figures and descriptions, can be implemented by computer system 800. Computer system 800 can implement communication devices as shown in FIGS. 1-3, device 401, device 501, device 530, device 601, and device 650, as shown in FIGS. 4A, 5A-5B, and 6A-6B.

Computer system 800 includes one or more processors (also called central processing units, or CPUs), such as a processor 804. Processor 804 is connected to a communication infrastructure 806 that can be a bus. One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as a display device 821, keyboards, pointing devices, etc., that communicate with communication infrastructure 806 through user input/output interface(s) 802. Display device 821 can be used to display ambiguated GUI 823, which can be similar to ambiguated GUI 114 of ambiguated application 111 as shown in FIGS. 1-3, ambiguated GUIs 414A, 414B, 514, 534, 614, and 652, as shown in FIGS. 4A-4B, 5A-5B, and 6A-6B.

Computer system 800 also includes a main or primary memory 808, such as random access memory (RAM). Main memory 808 may include one or more levels of cache. Main memory 808 has stored therein control logic (e.g., ambiguated application 811, which can be an example of ambiguated application 111 as shown in FIG. 1, or other computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A communication device, comprising:
a transceiver configured to communicate in a wireless communication network;
an ambiguated application to be operated by one or more processors, wherein the ambiguated application comprises displaying a graphic user interface (GUI) including a functional object; and
the one or more processors coupled to the transceiver, and configured to:
perform a communication function of a covert communication application whose functions are part of the ambiguated application in a covert communication state, wherein the covert communication application is not operative in a lock state of the covert communication state, wherein placement of the functional object in a predetermined way unlocks the covert communication application;
switching the ambiguated application from the covert communication state to a game state to perform as a game application; and
perform a game function of the game application whose functions are part of the ambiguated application, wherein the functional object has a same appearance when the ambiguated application is in the covert communication state and the game state, wherein the game application is different from the covert communication application, and wherein the game function is different from the communication function.

2. The communication device of claim 1, wherein the communication function comprises a push to talk voice communication control function.

3. The communication device of claim 1, wherein the ambiguated application in the covert communication state comprises one or more images and the functional object includes a portion of the one or more images.

4. The communication device of claim 3, wherein the one or more images correspond to communication groups, the one or more processors are further configured to switch from a first communication group to another, wherein the first communication group comprises the communication device and another communication device forming a mobile push-to-talk (PTT) group.

5. The communication device of claim 1, wherein the functional object comprises: an area defined by a shape transparent or invisible to a human, and wherein the functional object is controlled by a touch or a gesture of a user.

6. The communication device of claim 1, wherein the GUI further comprises a first visible indicator to indicate that the ambiguated application is in the covert communication state, and a second visible indicator to indicate that the ambiguated application is in a gallery state.

7. The communication device of claim 6, wherein the first visible indicator and the second visible indicator differ in color.

8. The communication device of claim 6, wherein the first visible indicator comprises a background image of the GUI in a a first tone the second visible indicator includes the background image in a second tone.

9. The communication device of claim 1, wherein the GUI further comprises one or more switching objects to switch the ambiguated application from the covert communication state to the game state, or from the game state to the covert communication state, and wherein to switch the ambiguated application, the one or more switching objects are activated by one or more control actions including taps, clicks, swipes, or gestures, or by a placement of a predetermined pattern formed by the one or more switching objects.

10. The communication device of claim 1, wherein the GUI is a first GUI for the ambiguated application, and the ambiguated application further includes a second GUI with substantially same functions as represented by the first GUI, and wherein the second GUI is active when the ambiguated application is in an explicit communication state.

11. The communication device of claim 1, wherein the ambiguated application is in an administrative state, and the one or more processors are configured to setup a portion of the GUI or the functional object.

12. The communication device of claim 1, wherein the wireless communication network is a first wireless communication network, the communication device is further configured to wirelessly communicate via a second wireless communication network.

13. The communication device of claim 1, wherein the communication device comprises a smart phone, a laptop, a tablet, a desktop computer, a server, a personal assistant, a monitor, a wearable device, an Internet of Thing (IoT) device, a mobile station, a subscriber station, a remote terminal, a wireless terminal, or a user device.

14. The communication device of claim 1, wherein the ambiguated application is managed by an operating system of the communication device, wherein the communication device further comprises a memory coupled to the one or more processors, wherein the memory comprises one allocated memory space for the ambiguated application including the first application and the second application.

15. A method for an ambiguated application operated on a device, comprising:
selecting a functional object of a graphic user interface (GUI) of the ambiguated application to perform a communication function of a covert communication application that is part of the ambiguated application, wherein the ambiguated application is in a covert communication state, wherein the covert communication application is not operative in a lock state of the covert communication state, wherein placement of the functional object in a predetermined way unlocks the covert communication application;
switching the ambiguated application from the covert communication state to a game state to perform as a game application;
selecting the functional object to perform a game function of a game application comprising a game function that is part of the ambiguated application, wherein the game application is different from the covert communication application, wherein the game function is different than the communication function, wherein the ambiguated application is in a game state, wherein the functional object has a same appearance when the ambiguated application is in the covert communication state and the game state;
setting up a portion of the GUI or the functional object, wherein the ambiguated application is in an administrative state; and
activating one or more switching objects of the GUI to switch the ambiguated application from the covert communication state, the game state, or the administrative state, to another state.

16. The method of claim 15, wherein the communication function is a control function for the covert communication application to manage a communication between the device and an other device.

17. The method of claim 15, wherein the ambiguated application performs as the covert communication application with the GUI, wherein the ambiguated application has a second GUI when the ambiguated application performs as the game application, and wherein the GUI, the second GUI, share at least the functional object in common.

18. The method of claim 15, wherein the functional object includes a an area that has no visible line boundary with a transient interior, and wherein the functional object is controlled by a touch or a gesture of a user; and
   wherein the first function comprises a push to talk voice communication control function.

19. A non-transitory computer-readable medium storing instructions that, when executed by a processor of a device, cause the processor to perform operations for an ambiguated application operated on the device, the operations comprising:
   operating a ambiguated application in a covert communication state controlled by a graphical user interface (GUI) of a covert communication application, wherein a functional object of the first GUI represents a communication function of the covert communication application that is part of the ambiguated application, wherein the covert communication application is not operative in a lock state of the covert communication state, wherein placement of the functional object in a predetermined way unlocks the covert communication application;
   switching the ambiguated application from the covert communication state to a game state to perform as a game application; and
   operating the ambiguated application in the game state controlled by the GUI, wherein the functional object of the GUI represents a game function for the game application that is part of the ambiguated application, wherein the covert communication application is different than the game application, wherein the communication function is different than the game function, and wherein the functional object has a same appearance when the ambiguated application is in the covert communication state and the game state.

20. The non-transitory computer-readable medium of claim 19, wherein the GUI in the covert communication state comprises one or more images, an image of the one or more images corresponds to a mobile push-to-talk (PTT) group comprising the device and another device.

21. The non-transitory computer-readable medium of claim 20, wherein the functional object comprises an area defined by a shape transparent or invisible to a human.

* * * * *